United States Patent
Hagihara et al.

(10) Patent No.: US 7,163,717 B2
(45) Date of Patent: Jan. 16, 2007

(54) COATED ZINC OXIDE PARTICLE, AND PRODUCTION PROCESS AND APPLICATIONS THEREOF

(75) Inventors: Hiroyuki Hagihara, Nagoya (JP); Jun Tanaka, Toyama (JP); Hisao Kogoi, Toyama (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/713,256

(22) Filed: Nov. 17, 2003

(65) Prior Publication Data

US 2004/0209081 A1    Oct. 21, 2004

Related U.S. Application Data

(63) Continuation-in-part of application No. PCT/JP02/04848, filed on May 20, 2002.

(60) Provisional application No. 60/292,923, filed on May 24, 2001.

(30) Foreign Application Priority Data

May 18, 2001  (JP)  ............................. 2001-148940

(51) Int. Cl.
*B05D 3/02*    (2006.01)
*B32B 5/16*    (2006.01)
*B27N 3/00*    (2006.01)

(52) U.S. Cl. ...................... 427/220; 428/328; 428/403; 264/239

(58) Field of Classification Search ................ 428/403, 428/407, 328; 427/212, 215, 220; 264/239
See application file for complete search history.

(56) References Cited

U.S. PATENT DOCUMENTS

| | | | | |
|---|---|---|---|---|
| 2,068,066 A | * | 1/1937 | O'Brien | 106/429 |
| 2,785,990 A | * | 3/1957 | Coulter | 106/429 |
| 3,042,539 A | * | 7/1962 | Csonka et al. | 106/429 |
| 3,615,809 A | * | 10/1971 | Nagle et al. | 106/280 |
| 4,128,630 A | * | 12/1978 | Hayashi et al. | 424/69 |
| 4,154,622 A | * | 5/1979 | Momoi et al. | 106/504 |
| 4,606,914 A | * | 8/1986 | Miyoshi | 424/63 |
| 4,818,614 A | * | 4/1989 | Fukui et al. | 428/403 |
| 4,923,518 A | * | 5/1990 | Brand et al. | 106/429 |
| 5,891,237 A | * | 4/1999 | Kinniard | 106/505 |
| 6,200,680 B1 | * | 3/2001 | Takeda et al. | 428/402 |
| 6,242,092 B1 | * | 6/2001 | Katsuyama et al. | 428/363 |
| 6,416,766 B1 | * | 7/2002 | Kobayashi et al. | 428/403 |
| 6,660,380 B1 | * | 12/2003 | Ishida et al. | 428/403 |

FOREIGN PATENT DOCUMENTS

| | | | |
|---|---|---|---|
| EP | 0 824 132 A | | 2/1998 |
| EP | 0 957 139 A | | 11/1999 |
| JP | 05-171130 | * | 7/1993 |
| JP | 05-171130 A | | 7/1993 |
| JP | 11-302015 A | | 11/1999 |

* cited by examiner

*Primary Examiner*—H. Thi Le
(74) *Attorney, Agent, or Firm*—Sughrue Mion, PLLC

(57) ABSTRACT

Coated zinc oxide particles in which the surfaces of zinc oxide particles are coated with a metallic soap exhibit excellent dispersibility in resin. A thermoplastic resin composition containing the particles and a molded product formed from the composition are endowed with excellent visible light transmission property and ultraviolet light shielding property.

13 Claims, No Drawings

COATED ZINC OXIDE PARTICLE, AND PRODUCTION PROCESS AND APPLICATIONS THEREOF

CROSS-REFERENCE TO RELATED APPLICATIONS

This is a Continuation-in-Part Application of pending prior PCT International Application No. PCT/JP02/04848 filed May 20, 2002, which claims benefit of Provisional Application No. 60/292,923 filed May 24, 2001; the above noted prior applications are all hereby incorporated by reference.

TECHNICAL FIELD

The present invention relates to zinc oxide employed in resin products, rubber products, paper products, cosmetics, pharmaceutical products, paint, printing ink, ceramic products, electronic parts, etc., and more particularly to coated zinc oxide particles exhibiting excellent dispersibility in resin; to a thermoplastic resin composition containing the particles, the composition being endowed with excellent visible light transmission property and ultraviolet light shielding property; to a molded product formed from the composition; and to production processes for the particles, the composition, and the molded product.

BACKGROUND ART

Zinc oxide (flowers of zinc) has long been known as a white pigment. Zinc oxide exhibits the following optical properties. When zinc oxide is formed into fine particles having a diameter approximately half the wavelength of visible light, the particles allow visible Light to pass therethrough since the scattering effect of the zinc dioxide particles is reduced considerably, and selectively absorb ultraviolet light by virtue of the excellent ultraviolet absorbing effect of zinc oxide.

Conventionally known ultraviolet absorbers include organic ultraviolet absorbers such as benzophenone-based absorbers, benzotriazole-based absorbers, salicylate-based absorbers, and substituted-acrylonitrile-based absorbers. However, a limitation is imposed on use of such an ultraviolet absorber, from the viewpoint of safety. Meanwhile, when such an ultraviolet absorber is incorporated into a thermoplastic resin or a similar material and the resultant mixture is subjected to molding, the absorber is decomposed because of its poor heat resistance or undergoes bleedout during molding. Therefore, zinc oxide particles exhibiting excellent safety and high heat resistance have become of interest as a replacement for organic ultraviolet absorbers.

Regarding ultraviolet absorbers containing such zinc oxide particles, Japanese Patent Application Laid-Open (kokai) No. 5-171130 discloses a resin molded product in which zinc oxide fine powder having a particle size of 0.1 μm or less is incorporated into a transparent resin. Japanese Patent Application Laid-Open (kokai) Nos. 5-295141 and 11-302015 disclose zinc oxide fine particles which are coated with a silicon compound, in order to reduce impairment of weather resistance of the fine particles attributable to the photocatalytic effect, and to improve dispersibility of the fine particles in a resin.

In addition, Japanese Patent No. 2501663 (International patent publication W090/06974) proposes a method for encapsulation of zinc oxide pigment composition by coating the composition with a deposit of a water insoluble metallic soap. In this method, a water-soluble alkali metal salt of saturated or unsaturated monocarboxylic acid having 7 to 22 carbon atoms and a water-soluble metallic salt consisting of a metallic cation and an inorganic anion portions are added to a slurry comprising a pigment zinc oxide composition, wherein the metallic cation is selected from IB, II, III, IV, V, VIB, VIIB or VIII group of the periodic table, and the inorganic anion portion is selected from a group consisting of a nitrate ion, a sulphate ion, and a halogen ion; and thus the water-soluble metallic soap of the saturated or unsaturated monocaboxylic acid is formed and deposited there.

However, conventional zinc oxide particles produced through the techniques disclosed in the above publications aggregate considerably and are difficult to disperse uniformly in a resin. Therefore, the resultant resin composition becomes turbid, and does not necessarily exhibit sufficient transparency.

Furthermore, a method using a solvent such as water or an organic solvent in the surface treatment requires a step of filtration and drying of the solvent, and tends to cause an uneven distribution of the surface treatment agent deposited by drying and aggregation of powders. Therefore, this method has a disadvantage in that excellent dispersiblity of the coated zinc oxide particles is difficult to obtain.

DISCLOSURE OF INVENTION

The present invention contemplates provision of coated zinc oxide particles exhibiting excellent dispersibility in resin; a thermoplastic resin composition containing the particles, the composition being endowed with excellent visible light transmission property and ultraviolet light shielding property; a molded product formed from the composition; and production processes for the particles, the composition, and the molded product.

The present inventors have performed extensive studies, and have attained the above objects by coating zinc oxide particles with metallic soap.

Accordingly, the present invention provides the following.

(1) A process for producing zinc oxide particles coated with a metallic soap, characterized in that the process comprises a step of mixing zinc oxide particles with a metallic soap at a temperature equal to or higher than the melting point of the metallic soap.

(2) Coated zinc oxide particles in which zinc oxide particles are coated with a metallic soap, wherein the coated zinc oxide particles are produced through the process as recited in (1).

(3) Coated zinc oxide particles according to (2), wherein zinc oxide has an average primary particle size of 0.005 to 0.1 μm.

(4) Coated zinc oxide particles according to (2) or (3), wherein the metallic soap is a fatty acid salt of at least one metal selected from the group consisting of magnesium, zinc, barium, calcium, and aluminum.

(5) Coated zinc oxide particles according to any one of (2) through (4), wherein the metallic soap is a metallic salt of at least one fatty acid selected from the group consisting of lauric acid, myristic acid, palmitic acid, stearic acid, isostearic acid, oleic acid, behenic acid, montanic acid, and derivatives thereof.

(6) Coated zinc oxide particles according to any one of (2) or (3), wherein the metallic soap is at least one species selected from the group consisting of zinc stearate, magnesium stearate, and calcium stearate.

(7) Coated zinc oxide particles according to any one of (2) through (6), wherein zinc oxide particles have siloxane bonding on the surfaces thereof.
(8) A thermoplastic resin composition comprising at least one thermoplastic resin and coated zinc oxide particles as recited in any one of (2) through (7).
(9) A thermoplastic resin composition according to (8), which assumes the form of a compound or masterbatch.
(10) A thermoplastic resin composition according to (8), wherein the amount of the zinc oxide particles falls within a range of 0.01 to 80 mass % on the basis of the entirety of the composition.
(11) A molded product formed through molding of a thermoplastic resin composition as recited in any one of (8) through (10).
(12) A molded product according to (11), which is at least one species selected from among fiber, film, and plastic molded products.
(13) A process for producing a thermoplastic resin composition as recited in any one of (8) through (10), comprising a step of adding coated zinc oxide particles as recited in any one of (2) through (7).
(14) A process for producing a molded product as recited in (11) or (12), comprising a step of molding a thermoplastic resin composition as recited in any one of (8) through (10).

BEST MODE FOR CARRYING OUT THE INVENTION

As used herein, the term "metallic soap" refers to a salt of a fatty acid having 10 or more carbon atoms, among metal-containing fatty acid salts. Examples of the metallic soap include metallic salts of lauric acid, myristic acid, palmitic acid, stearic acid, isostearic acid, oleic acid, behenic acid, montanic acid, derivatives thereof, etc. Examples of the element constituting the metallic salt include magnesium, zinc, barium, calcium, and aluminum. Of these metallic soaps, for example, zinc stearate, magnesium stearate, or calcium stearate is preferred, since it is easy to obtain them industrially and they exert an excellent effect of improving dispersibility of zinc oxide particles in a resin. These metallic soaps may be preferably used in the present invention.

No particular limitation is imposed on the zinc oxide particles employed in the present invention, so long as the particles predominantly contain zinc oxide, and exhibit the aforementioned optical properties. No particular limitation is imposed on the method for producing zinc oxide employed as a raw material in the present invention, and the zinc oxide may be produced through any of a French method, an American method, and a wet method. The zinc oxide particles preferably have an average primary particle size of 0.001 to 0.2 µm, more preferably 0.005 to 0.1 µm. When the average primary particle size is 0.001 µm or less, efficient production of the particles becomes difficult, whereas when the average primary particle size exceeds 0.2 µm, a resin containing coated zinc oxide particles formed of the particles may fail to exhibit sufficient transparency.

In order to impart properties such as weather resistance and electrical conductivity to a resin containing the zinc oxide particles, in the present invention, zinc oxide particles which have undergone surface treatment may be employed as a raw material. For example, in order to improve the weather resistance of a resin containing the coated zinc oxide particles, zinc oxide particles having siloxane bonding on the surfaces thereof may be employed. Examples of the zinc oxide particles having siloxane bonding include zinc oxide particles coated with silica, silicone, alkoxysilane, etc. Examples of the coating method include, but are not limited to, a method in which zinc oxide particles are dry-mixed with silicone or alkoxysilane; and a method in which zinc oxide particles are added to a sodium silicate aqueous solution, and the resultant solution is neutralized with hydrochloric acid or sulfuric acid, followed by filtration, washing, and drying.

The coated zinc oxide particles of the present invention are produced by mixing zinc oxide particles with a metallic soap by use of, for example, a high-speed mixer at a temperature equal to or higher than the melting point of the metallic soap. Thus, when zinc oxide particles are mixed with a metallic soap at a temperature equal to or higher than the melting point of the metallic soap, the zinc oxide particles are uniformly coated with the metallic soap. When zinc oxide particles are mixed with a metallic soap at a temperature lower than the melting point of the metallic soap, uniform coating of the particles with the metallic soap is difficult to attain, and improvement in dispersibility of the particles in a resin may fail to be attained. When coated zinc oxide particles are to be incorporated into the below-described resin, the amount of the metallic soap is preferably 0.1 to 50 mass %, more preferably 1 to 20 mass %, on the basis of the entirety of the zinc oxide particles. When the amount is less than 0.1 mass %, the zinc oxide particles fail to exhibit good dispersibility in the resin, whereas when the amount exceeds 50 mass %, there arise problems such as occurrence of bleedout and generation of soot during molding.

When coated zinc oxide particles and a thermoplastic resin are melt-kneaded and pelletized in a twin-screw kneading extruder, it is considered that if the increase in the extruding pressure is smaller, the coated zinc oxide particles exhibit more excellent dispersibility in the resin. For example, by use of a small-sized twin-screw kneading extruder having a size of 15 mm (KZW15-30MG, product of Technovel Corporation), the coated zinc oxide particles (22 parts by mass) and low-density polyethylene (Jrex JH607C, product of Japan Polyolefins Co., Ltd.) (78 parts by mass) are melt-kneaded at 150° C., and pelletized at an extrusion rate of 1 kg/hr, to thereby produce a low-density-polyethylene columnar compound (1 kg) containing zinc oxide particles, each having a diameter of 1 mm, a length of 3 to 5 mm, and a weight of 0.003 to 0.01 g. When the compound (1 kg) is produced, a stainless-steel mesh of 45 µm is mounted on a breaker plate of the twin-screw kneading extruder. When the compound (1 kg) is thus produced using the coated zinc oxide particles, an increase in extruding pressure is 5 MPa or less, and preferably 2 MPa or less.

The zinc oxide particles of the present invention may be incorporated into a thermoplastic resin, to thereby prepare a thermoplastic resin composition. Specific examples of the thermoplastic resin include polyethylene, polypropylene, polystyrene, polyethylene terephthalate, AS resin, ABS resin, AES resin, polyvinylidene chloride, methacrylic resin, polyvinyl chloride, polyamide, polycarbonate, polyallyl ester, polyimide, polyacetal, polyether ketone, polyether sulfone, polyphenyl oxide, and polyphenylene sulfide.

The thermoplastic resin composition containing the zinc oxide particles of the present invention may be employed in the form of a compound, masterbatch, etc. The amount of the zinc oxide particles in the thermoplastic resin composition is 0.01 to 80 mass %, preferably 1 to 50 mass %, on the basis of the entirety of the composition. The thermoplastic resin composition may contain additives such as an antioxidant and an antistatic agent.

In the present invention, the aforementioned thermoplastic resin composition is subjected to molding, to thereby form a molded product exhibiting ultraviolet shielding property. Examples of the molded product include fiber, film, and plastic molded products.

In addition, the molded products of the present invention may be comprised in a part of a structure. Such structure is not particularly limited, and for a example, may be composed of an inorganic compound such as metal, concrete, glass, ceramics, or the like; or an organic compounds such as paper, plastic, woods, leather, or the like. Alternatively, a mixture of these compounds can be used. Examples of the structure include wrapping materials, building materials, machines, vehicles, glass products, appliance, agricultural materials, electronics, tools, tablewares, bath articles, toilet articles, furniture, clothes, fabrics, fibers, leather products, paper products, sporting goods, futons, containers, glasses, signboards, pipings, wirings, hardware, sanitary goods, automobile supplies, tents, stockings, socks, gloves, masks, and the like.

EXAMPLES

The present invention will next be described in more detail by way of Examples, which should not be construed as limiting the invention thereto.

Example 1

Zinc oxide particles (size of primary particles: 0.03 μm) (UFZ-40, product of Showa Titanium Co., Ltd.) (20 kg) and zinc stearate (Zinc Stearate S, melting point: 120° C., product of NOF Corporation) (2 kg) were placed in a 300-liter high-speed stirring mixer (Super Mixer SMG-300, product of KAWATA MFG Co., Ltd.). Subsequently, the resultant mixture was mixed at an impeller peripheral speed of 20 m/s while being heated from the outside by use of steam, until the temperature of the resultant powder became 140° C. Subsequently, the powder was left to cool, to thereby yield zinc oxide particles coated with zinc stearate.

Subsequently, by use of a small-sized twin-screw kneading extruder having a size of 15 mm (KZW15-30MG, product of Technovel Corporation), the zinc oxide particles coated with zinc stearate (22 parts by mass) and low-density polyethylene (Jrex JH607C, product of Japan Polyolefins Co., Ltd.) (78 parts by mass) were melt-kneaded at 150° C., and pelletized at an extrusion rate of 1 kg/hr, to thereby produce a low-density polyethylene columnar compound (1 kg) containing zinc oxide particles, each having a diameter of 1 mm, a length of 3 to 5 mm, and a weight of 0.003 to 0.01 g When the compound (1 kg) was produced, a stainless-steel mesh of 45 μm was mounted on a breaker plate of the twin-screw kneading extruder, and an increase in pressure was measured. As a result, the pressure was increased by only 0.5 MPa, and the zinc oxide particles coated with zinc stearate were found to be uniformly dispersed in the low-density polyethylene.

Subsequently, the above-produced low-density polyethylene compound containing the zinc oxide particles (200 g) and low-density polyethylene (Jrex JH607C, product of Japan Polyolefins Co., Ltd.) (1,800 g) were mixed together for 10 minutes by use of a V-type blender (RKI-40, product of Ikemoto Scientific Technology Co., Ltd.), to thereby prepare a pellet mixture.

Subsequently, the resultant pellet mixture was subjected to extrusion by use of a small-sized twin-screw kneading extruder having a T die of 200 mm (KZW15-30MG, product of Technovel Corporation), at a die temperature of 250° C., to thereby form a film having a thickness of 80 μm. The resultant low-density polyethylene film was subjected to measurement of transmittance by use of a spectrophotometer (UV-2400PC, product of Shimadzu Corporation. Transmittance at 360 nm was found to be 0%, and transmittance at 550 nm was found to be 90%. The results are shown in Table 1. When the polyethylene film becomes turbid so as to reduce transparency thereof, the visible transmittance of the film is lowered. Therefore, the transmittance of the film at 550 nm is employed as an index of transparency.

Example 2

The procedure of Example 1 was repeated, except that the zinc stearate was replaced by calcium stearate (Calcium Stearate S, melting point: 152° C., product of NOF Corporation), and mixing was carried out under heating at 160° C., by use of the high-speed stirring mixer. The results are shown in Table 1.

Example 3

The procedure of Example 1 was repeated, except that the zinc stearate was changed to magnesium stearate (Magnesium Stearate, melting point: 123° C., product of NOF Corporation). The results are shown in Table 1.

Example 4

The procedure of Example 1 was repeated, except that the zinc stearate was replaced by magnesium behenate (MS-7, melting point: 116° C., product of Eisin Chemical Co., Ltd.) The results are shown in Table 1.

Example 5

The procedure of Example 1 was repeated, except that the zinc stearate was replaced by zinc laurate (Z3-3, melting point: 130° C., product of NOF Corporation). The results are shown in Table 1.

Example 6

Zinc oxide particles (size of primary particles: 0.03 μm) (UFZ-40, product of Showa Titanium Co., Ltd.) (20 kg) were placed in a 300-liter high-speed stirring mixer (Super Mixer SMG-300, product of KAWATA MFG Co., Ltd.), and then mixed at an impeller peripheral speed of 10 m/s. Subsequently, silicone having siloxane bonding (AFP-1, product of Shin-Etsu Chemical Co., Ltd.) (600 g) was sprayed through a two-fluid nozzle onto the zinc oxide particles in the mixer. Thereafter, the resultant zinc oxide particles were mixed at an impeller peripheral speed of 20 m/s while being heated from the outside by use of steam, until the temperature of the resultant powder became 140° C. Subsequently, the powder was left to cool, to thereby yield zinc oxide particles coated with silicone.

The resultant silicone-coated zinc oxide particles were coated with zinc stearate in a manner similar to that of Example 1, and subsequently, a low-density polyethylene film containing the zinc oxide particles was formed in a manner similar to that of Example 1. The results are shown in Table 1.

Comparative Example 1

The procedure of Example 1 was repeated, except that zinc oxide particles (size of primary particles: 0.03 μm) (UFZ-40, product of Showa Titanium Co., Ltd.) were not coated with zinc stearate, to thereby form a low-density polyethylene film containing the zinc oxide particles. The results are shown in Table 1.

Comparative Example 2

The silicone-coated zinc oxide particles obtained in Example 4 were not coated with zinc stearate, and a low-density polyethylene film containing the zinc oxide particles was formed in a manner similar to that of Example 1. The results are shown in Table 1.

Comparative Example 3

The procedure of Example 1 was repeated, except that mixing was carried out under heating at 100° C. by use of the high-speed stirring mixer. The results are shown in Table 1.

Comparative Example 4

Zinc oxide particles (size of primary particles: 0.03 μm) (UFZ-40, product of Showa Titanium Co., Ltd.) (400 g), zinc stearate (Zinc Stearate S, melting point: 120° C., product of NOF Corporation) (40 g), and low-density polyethylene (Jrex JH607C, product of Japan Polyolefins Co., Ltd.) (1,560 g) were mixed together for 10 minutes by use of a V-type blender (RKI-40, product of Ikemoto Scientific Technology Co., Ltd.). The resultant mixture was kneaded by use of a small-sized twin-screw extruder in a manner similar to that of Example 1, and subsequently, a low-density polyethylene film containing the zinc oxide particles was formed in a manner similar to that of Example 1. The results are shown in Table 1.

Comparative Example 5

Low-density polyethylene (Jrex JH607C, product of Japan Polyolefins Co., Ltd.) was melt-extruded at 150° C. and at an extrusion rate of 1 kg/hr by use of a small-sized twin-screw kneading extruder having a size of 15 mm (KZW15-30MG, product of Technovel Corporation), to thereby produce columnar pellets (1 kg), each having a diameter of 1 mm, a length of 3 to 5 mm, and a weight of 0.003 to 0.01 g. During pelletization, in a manner similar to that of Example 1, a stainless-steel mesh of 45 μm was mounted on a breaker plate of the twin-screw kneading extruder, and an increase in pressure was measured.

Subsequently, the above-produced low-density polyethylene pellets were subjected to extrusion by use of a small-sized twin-screw kneading extruder having a T die of 200 mm (KZW15-30MG, product of Technovel Corporation) at a die temperature of 250° C., to thereby form a film having a thickness of 80 μm. The resultant low-density polyethylene film was subjected to measurement of transmittance by use of a spectrophotometer (UV-2400PC, product of Shimadzu Corporation). The results are shown in Table 1.

Comparative Example 6

An aqueous solution (80 L) containing sodium stearate (2 kg) at 85° C. was added to a slurry containing zinc oxide particles (size of primary particles: 0.03 μm) (UFZ-40, product of Showa Titanium Co., Ltd.) (20 kg) and water (180 kg). Then, an aqueous solution (40L) containing zinc nitrate (1.2 kg) was added to the slurry and a pH value of the slurry was adjusted to 7 using 5N NaOH solution. Next, after the slurry was filtrated and washed, the slurry was dried at 105° C. overnight and pulverized. The obtained powder contained 10% by mass of zinc stearate. Next, using this powder, a low-density polyethylene film comprising zinc oxide particles was formed in a manner similar to that of in the Example 1. The results are shown in Table 1.

Comparative Example 7

Zinc stearate (Zinc Stearate S, melting point: 120° C., product of NOF Corporation) (2 kg) was added and dissolved in benzene (200 L), and zinc oxide particles (size of primary particles: 0.03 μm) (UFZ-40, product of Showa Titanium Co., Ltd.) (2 kg) was added thereto. Then the slurry was dried by a spray-drier (DCDA28-50N, manufactured by SAKAMOTO ENGINEERING CO., LTD.) and was pulverized. Next, using this powder, a low-density polyethylene film comprising zinc oxide particles was formed in a manner similar to that in the Example 1. The results are shown in Table 1.

TABLE 1

| | Siloxane bonding on the surface of zinc oxide fine particles | Metallic soap | | Coating method | Heating-mixing temperature | Increase in pressure during melting-kneading | Light transmittance of film | |
|---|---|---|---|---|---|---|---|---|
| | | Type | Melting point | | | | Wavelength 360 nm | Wavelength 550 nm |
| Ex. 1 | No | Zinc stearate | 120° C. | Dry | 140° C. | 0.5 Mpa | 0% | 90% |
| Ex. 2 | No | Calcium stearate | 152° C. | Dry | 160° C. | 1.5 Mpa | 1% | 82% |
| Ex. 3 | No | Magnesium stearate | 123° C. | Dry | 140° C. | 1.0 Mpa | 1% | 86% |
| Ex. 4 | No | Magnesium behenate | 116° C. | Dry | 140° C. | 0.8 Mpa | 0% | 91% |
| Ex. 5 | No | Zinc laurate | 130° C. | Dry | 140° C. | 0.7 Mpa | 0% | 90% |

TABLE 1-continued

| | Siloxane bonding on the surface of zinc oxide fine particles | Metallic soap Type | Metallic soap Melting point | Coating method | Heating-mixing temperature | Increase in pressure during melting-kneading | Light transmittance of film Wavelength 360 nm | Light transmittance of film Wavelength 550 nm |
|---|---|---|---|---|---|---|---|---|
| Ex. 6 | Yes | Zinc stearate | 120° C. | Dry | 140° C. | 0.3 Mpa | 0% | 92% |
| Comp. Ex. 1 | No | None | — | — | — | 28 Mpa | 15% | 70% |
| Comp. Ex. 2 | Yes | None | — | — | — | 14 Mpa | 5% | 74% |
| Comp. Ex. 3 | No | Zinc stearate | 120° C. | Dry | 100° C. | 8.0 Mpa | 3% | 77% |
| Comp Ex. 4 | No | Zinc stearate | 120° C. | Dry | No heating | 10 Mpa | 3% | 75% |
| Comp. Ex. 5 | — | — | — | — | — | 0 Mpa | 94% | 95% |
| Comp Ex. 6 | No | Zinc stearate | 120° C. | Wet | — | 17 Mpa | 4% | 70% |
| Comp. Ex. 7 | No | Zinc stearate | 120° C. | Wet | — | 12 Mpa | 4% | 76% |

INDUSTRIAL APPLICABILITY

The present invention provides zinc oxide particles coated with a metallic soap, which exhibit excellent dispersibility in resin; a thermoplastic resin composition such as a compound, masterbatch, or the like, containing the particles, the composition being endowed with excellent visible light transmission property and ultraviolet light shielding property; a molded product such as a fiber, a film, plastic or the like, formed from the thermoplastic resin composition; and production processes for the particles, the composition, and the molded product.

The invention claimed is:

1. A process for producing zinc oxide particles coated directly with a metallic soap, which is a salt of a fatty acid having 10 or more carbon atoms the process comprising mixing zinc oxide particles consisting of zinc oxide with a metallic soap at a temperature equal to or higher than a melting point of the metallic soap.

2. Coated zinc oxide particles comprising: zinc oxide particles consisting of zinc oxide and a metallic soap coated directly on the zinc oxide particles,
wherein the coated zinc oxide particles are produced through the process according to claim 1.

3. Coated zinc oxide particles according to claim 2, wherein the zinc oxide particles have an average primary particle size of 0.005 to 0.1 μm.

4. Coated zinc oxide particles according to claim 2 or 3, wherein the metallic soap is a fatty acid salt of at least one metal selected from the group consisting of magnesium, zinc, barium, calcium, and aluminum.

5. Coated zinc oxide particles according to claim 2 or 3, wherein the metallic soap is a metallic salt of at least one fatty acid selected from the group consisting of laurie acid, myristic acid, palmitic acid, stearic acid, isostearic acid, oleic acid, behenic acid, montanic acid, and derivatives thereof.

6. Coated zinc oxide particles according to claim 2 or 3, wherein the metallic soap is at least one species selected from the group consisting of zinc stearate, magnesium stearate, and calcium stearate.

7. A thermoplastic resin composition comprising at least one thermoplastic resin and coated zinc oxide particles according to claim 2.

8. A thermoplastic resin composition according to claim 7, wherein the thermoplastic resin composition is in a form of a compound or a masterbatch.

9. A thermoplastic resin composition according to claim 7, wherein a mass percentage of an amount of the zinc oxide particles to the whole thermoplastic resin composition falls within a range of 0.01 to 80 mass %.

10. A molded product formed through molding of a thermoplastic resin composition according to claim 7.

11. A molded product according to claim 10, wherein the molded product is in a form of at least one species selected from among fiber, film, and plastic molded products.

12. A process for producing a thermoplastic resin composition, the process comprising a step of adding coated zinc oxide particles according to claim 2 to a thermoplastic resin.

13. A process for producing a molded product, the process comprising a step of molding a thermoplastic resin composition according to claim 7.

* * * * *